(12) United States Patent
Hsiao et al.

(10) Patent No.: US 10,439,487 B2
(45) Date of Patent: Oct. 8, 2019

(54) VOLTAGE CONVERTER CIRCUIT AND METHOD FOR OPERATING A VOLTAGE CONVERTER CIRCUIT

(71) Applicant: Infineon Technologies Austria AG, Villach (AT)

(72) Inventors: Yi-Chou Hsiao, Taipei (TW); Chia Jui Chang, Taipei (TW); Jin Hung Lin, Taipei (TW)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/946,457

(22) Filed: Apr. 5, 2018

(65) Prior Publication Data

US 2018/0309358 A1    Oct. 25, 2018

(30) Foreign Application Priority Data

Apr. 6, 2017  (DE) .................. 10 2017 107 390

(51) Int. Cl.
  *H02M 1/34*   (2007.01)
  *H02M 3/335*  (2006.01)
  *H02M 1/44*   (2007.01)
  *H02M 1/00*   (2006.01)

(52) U.S. Cl.
  CPC .......... *H02M 1/34* (2013.01); *H02M 3/33576* (2013.01); *H02M 1/44* (2013.01); *H02M 2001/0006* (2013.01); *H02M 2001/348* (2013.01)

(58) Field of Classification Search
  CPC ..... H02M 1/34; H02M 2001/348; H02M 1/44
  See application file for complete search history.

(56) References Cited

U.S. PATENT DOCUMENTS

| 5,959,439 A   | * | 9/1999 | Shenai ............... H02M 3/1563 323/222 |
| 6,181,579 B1  | * | 1/2001 | Nagai ............... H02M 3/33592 363/21.06 |
| 9,019,724 B2  |   | 4/2015 | Telefus |
| 2014/0133200 A1 | | 5/2014 | Sun et al. |

FOREIGN PATENT DOCUMENTS

DE    102013012536 A1    1/2014

OTHER PUBLICATIONS

Office Action, in the German language, from counterpart German Application No. 102017107390.6, dated Feb. 9, 2018, 10 pp.

* cited by examiner

*Primary Examiner* — Adolf D Berhane
*Assistant Examiner* — Afework S Demisse
(74) *Attorney, Agent, or Firm* — Shumaker & Sieffert, P.A.

(57) ABSTRACT

Converter devices and methods are disclosed. A supply voltage (Vcc), for example to supply a control circuit (11) controlling a switch (Q1), is generated using an additional current path (16) and a snubber circuit (12).

20 Claims, 6 Drawing Sheets

VOLTAGE CONVERTER CIRCUIT AND METHOD FOR OPERATING A VOLTAGE CONVERTER CIRCUIT

PRIORITY INFORMATION

This Application claims priority to German Application Number 10 2017 107 390.6, filed on Apr. 6, 2017, the entire content of which is incorporated herein by reference.

TECHNICAL FIELD

The present application relates to voltage converter circuits and to methods for operating such voltage converter circuits.

BACKGROUND

Voltage converter circuits are used to convert an input voltage to an output voltage. Such voltage converters may convert a DC (Direct Current) voltage to another DC voltage, a DC voltage to an AC (Alternating Current) voltage, an AC voltage to an AC voltage or an AC voltage to a DC voltage, depending on the type of voltage converter.

Some types of voltage converters are referred to as switched mode power supplies (SMPS) which use switches together with capacitors and/or inductors to perform the voltage conversion. The switches are operated in a certain duty cycle to reach a desired output voltage. Voltage converters of these types include buck converters, boost converters or buck-boost converters.

One particular type of converters related to buck-boost converters are flyback converters, which are used in both AC/DC and DC/DC conversion. Flyback converters provide a galvanic isolation between an input and an output thereof by splitting an inductor used in a conventional buck-boost converter to form a transformer, the transformer providing galvanic isolation. In such flyback converters, the input voltage is applied at a circuit part coupled to a primary side of the transformer, while an output voltage is generated in a circuit part coupled to a secondary side of the transformer.

To maintain the galvanic isolation, a control circuit controlling switching of one or more switches of the second circuit part needs to be supplied on the second circuit part side and cannot for example use the input voltage directly as a supply, as this would break the galvanic isolation.

Conventional approaches use for example an additional winding in the transformer to generate such a supply voltage. This additional winding, however, increases the costs of the circuit. Therefore, a need exists for voltage converter circuits providing a stable supply voltage which are comparatively cheap to implement.

SUMMARY

A voltage converter device as defined in claim 1 or claim 12 as well as a method as defined in claim 16 are provided. The dependent claims define further embodiments.

According to an embodiment, a voltage converter device is provided, comprising:
a first terminal to be coupled to a winding of a transformer,
a second terminal to provide an output voltage,
a switch coupled between the first terminal and the second terminal,
a snubber circuit having a first snubber terminal and a second snubber terminal, wherein the first snubber terminal is coupled between the switch and the second terminal,
a first diode coupled between the second terminal of the snubber circuit and a supply voltage node,
a first capacitor coupled between the supply voltage node and the first terminal, and
an additional current path having a first end and a second end, wherein a first end of the additional current path is coupled between the first terminal and the switch and wherein the second end of the additional current path is coupled between the second snubber terminal and the first diode.

According to another embodiment, a voltage converter device is provided, comprising:
a first terminal to be coupled to a winding,
a second terminal to output a voltage,
a switch transistor coupled between the first terminal and the second terminal,
a series connection between a first resistor and a first capacitor coupled between a first node and a second node, wherein the first node is between the switch transistor and the second terminal,
at least one of a diode and a second capacitor coupled between a third node and the second node, wherein the third node is between the first terminal and the switch transistor,
a series connection of a second resistor and a second diode coupled between the second node and a supply voltage node, and
a parallel connection of a third diode and a third capacitor coupled between the third node and the supply voltage node.

According to another embodiment, a method of operating a voltage converter device is provided, the voltage converter device comprising:
a first terminal to be coupled to a winding of a transformer,
a second terminal to provide an output voltage,
a switch coupled between the first terminal and the second terminal,
a snubber circuit having a first snubber terminal and a second snubber terminal, wherein the first snubber terminal is coupled between the switch and the second terminal,
a first diode coupled between the second snubber terminal and a supply voltage output node,
a first capacitor coupled between the supply voltage node and the first terminal, and
an additional current path having a first end and a second end, wherein a first end of the additional current path is coupled between the first terminal and the switch and wherein the second end of the additional current path is coupled between the second snubber terminal,
the method comprising:
discharging a second capacitor of the snubber circuit when in a first state of the voltage converter device, and
charging the first capacitor in a second state of the voltage converter device.

The above summary is merely intended to give a brief overview over some features of some embodiments and is not to be construed as limiting in any way.

DETAILED DESCRIPTION

In the following, various embodiments will be described in detail referring to the attached drawings. These embodiments are given by way of example only and are not to be construed as limiting. For example, while embodiments may be described as comprising numerous features or components, in other embodiments some of these features or components may be omitted, and/or may be replaced by alternative features or components. Furthermore, in addition to the features or components explicitly shown and described herein, further features or components used in conventional voltage converter devices may be provided.

Features from different embodiments may be combined unless noted otherwise. Variations or modifications described with respect to one of the embodiments may also be applied to other embodiments.

In embodiments, any direct electrical connection or coupling between components, i.e. connection or coupling without intervening components like a wire connection, may also be implemented by an indirect connection or coupling, i.e. a connection or coupling with one or more additional intervening components, as long as the technical function of the connection or coupling, for example to transmit a certain kind of signal, to block certain kinds of signals, to provide a voltage or to provide a control, is maintained. In other words, modifications to connections or couplings which do not change their technical functions are within the scope of the present application.

Figure 1:
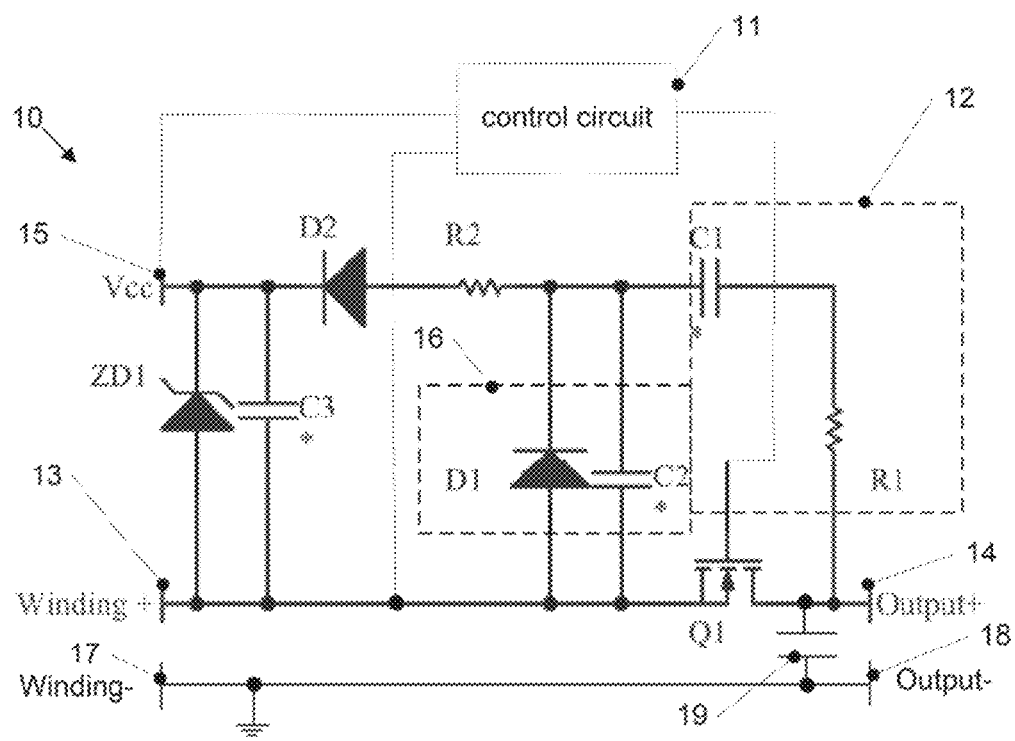
FIG. 1 is a circuit diagram of a converter device according to an embodiment.

FIG. 1 illustrates a voltage converter device 10 according to an embodiment which may be used to implement a flyback converter. Device 10 of FIG. 1 may be integrated on a single chip but is not limited thereto. Device 10 of FIG. 1 comprises a first terminal 13 to be coupled to a terminal of a secondary winding of a transformer used for implementing e.g. a flyback converter, and an output terminal 14 to output a generated voltage. An input voltage is then coupled to a primary winding of the transformer.

In the embodiment of FIG. 1, a second terminal 17 is to be coupled to a further terminal of the secondary winding of the transformer and is coupled to ground and a further output terminal 18. A device to be supplied with power in operation may be coupled to output terminals 14, 18. An output capacitor 19 is coupled between output terminals 14, 18. It should be noted that in other embodiments a further circuit like the one shown in FIG. 1 or also a conventional circuit may be coupled to another terminal of the secondary winding of the transformer to provide a second output.

Device 10 of FIG. 1 comprises a switch Q1 implemented as a N-MOSFET transistor in this example coupled between terminals 13, 14 as shown. Other switches, e.g. other types of transistors, may also be used. Switch Q1 is a switch which is operated by a control circuit 11 by applying a signal to a control terminal (e.g. gate) of switch Q1, which may be implemented together with the rest of device 10 or may be an external component, to provide the function of a voltage converter. Moreover, the device of FIG. 1 comprises a snubber circuit 12 comprising a resistor R1 and a capacitor C1 coupled to a node between switch Q1 and terminal 14 as shown. Resistor R1 may have a resistance of about 1 Ohm, and capacitor C1 may have a capacitance of about 1 nF at 250 V, although these and other values given in the following for components of the circuit are merely examples and may vary depending on the implementation. Snubber circuit 12 in the embodiment of FIG. 1 on the one hand serves to reduce disturbances like spikes caused by a winding reverse voltage on the secondary winding coupled to first terminal 13 and/or a leakage inductance and on the other hand serves to decrease radiated electromagnetic interference (EMI).

Furthermore, the circuit of FIG. 1 comprises a diode D2 and a resistor R2 coupled in series between snubber circuit 12 and terminal 15 as well as a Zener diode ZD1 and a capacitor C3 coupled between first terminal 13 and node 15. Finally, for generation of the supply voltage Vcc at node 15, the device of FIG. 1 comprises an additional path 16 comprising a diode D1 and a capacitor C2. Diodes D1 and D2 may be 1V/100 A Schottky diodes, Zener diode ZD1 may be an 18V Zener diode, resistor R2 may have a resistance of about 4.7 kOhm, and capacitor C3 may have a capacitance of about 1 µF, although these are only non-limiting examples. Path 16 is coupled to terminal 13 at one end thereof and to a node between resistor R2 and snubber circuit 12 at another end thereof. While in the embodiment of FIG. 1 circuit 16 comprises a diode D1 and a capacitor C2, in other embodiments one of diode D1 and capacitor C2 may be omitted, such that only the other one of diode D1 and capacitor C2 is provided. The diodes D1, D2 and ZD1 are orientated with their anodes and cathodes as shown in FIG. 1. Control circuit 11 is supplied with power by being coupled to supply voltage Vcc at node 15 and to first terminal 13. In other words, supply voltage Vcc is generated between node 15 and first terminal 13 in the embodiment of FIG. 1.

Figure 2:
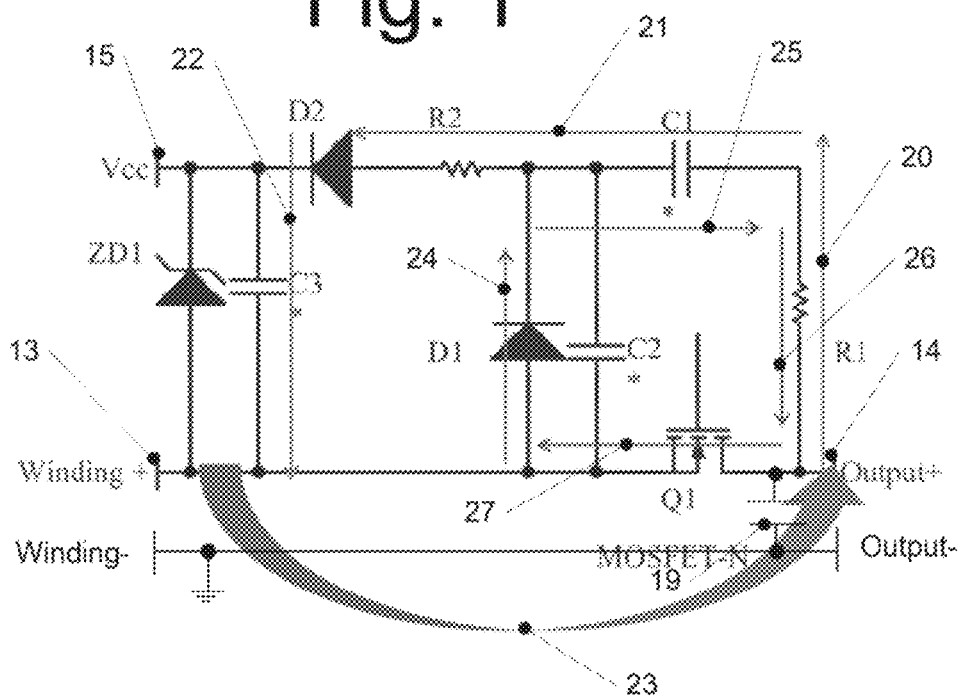
FIG. 2 is a diagram for illustrating operation of the converter circuit of FIG. 1.

By path 16 in some embodiments a cost-effective way of providing supply voltage Vcc at node 15 may be provided. In some embodiments, with the connection shown in FIG. 1 snubber circuit 12 helps to—provide energy to supply voltage Vcc. Resistor R2 serves to limit current when a winding voltage at first terminal 13 is high, diode D2 serves to prevent energy flow back to snubber circuit 12 during a voltage reverse at the winding coupled to first terminal 13, capacitor C3 contributes to make supply voltage Vcc constant and diode ZD1 serves to limit supply voltage Vcc. Moreover, at least in embodiments where control circuit 11 is integrated with the remaining device 10, only two terminals 13, 14 are needed, for example as pins in a chip package. Moreover, compared to some conventional solutions the embodiment of FIG. 1 may be provided at both terminals of a secondary winding of a transformer, no additional regulator is needed for regulating supply voltage Vcc, and some embodiments implemented as shown in FIG. 1 may have a higher energy efficiency. The energy delivered at node 15 depends on $\frac{1}{2} \times C1 \times Vcc \times Vcc \times f$, f being the switching frequency of switch Q1 Operation of the device of FIG. 1 will now be explained with reference to FIG. 2. FIG. 2 essentially reproduces a part of FIG. 1, with additional arrows 20 to 23 to illustrate operation.

When control circuit 11 of FIG. 1 switches switch Q1 on (i.e. a closed state of the switch where switch Q1 provides a low ohmic connection), in such a first state as indicated by arrows 24, 25, 26 and 27, current passes through R1, C1, D1 and Q1 to discharge capacitor C1. Conversely, in a second state when switch Q1 is turned off (opened) to essentially provide an electric isolation between its terminals (apart from possible leakage currents) and a primary switch on a primary side of a transformer coupled to first terminal 13, e.g. a MOSFET switch, is turned on causing a voltage at first terminal 13 to go to negative values with respect to ground, as indicated by arrows 20, 21, 22 and 23 (path 23 is through a winding coupled to first terminal 13, ground (coupled to the further terminal of the winding via second terminal 17 as shown) and output capacitor 19 to second output terminal 14), current passes through R1, C1, R2, D2, C3 and the winding of the transformer coupled to terminal 13 to charge capacitor C3.

As indicated schematically by an arrow 23, this generates the output voltage at terminal 14 and moreover generates supply voltage Vcc at node 15 to supply for example a control circuit controlling switch Q1 like control circuit 11 of FIG. 1.

Figure 3:
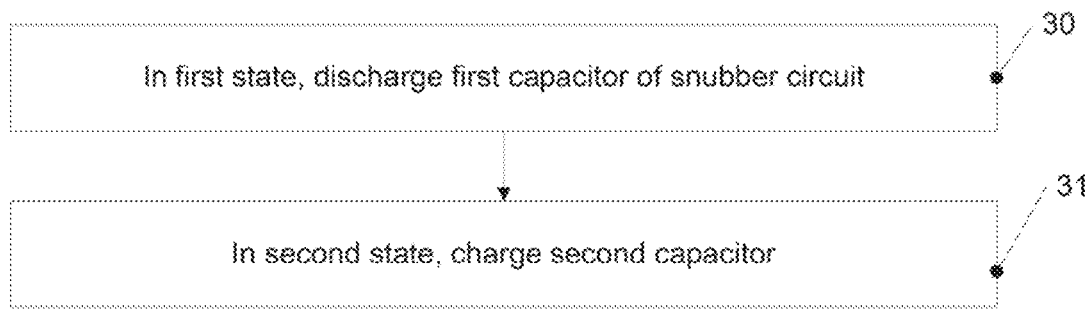
FIG. 3 is a flow chart illustrating a method according to an embodiment.

This operation is summarized in FIG. 3, which illustrates a method according to an embodiment. For ease of reference, the method of FIG. 3 will be described referring to FIGS. 1 and 2, but is not limited thereto. While the method of FIG. 3 is shown and described as series of acts or events, the order in which these acts or events are presented are not to be construed as limiting. In particular, the acts or events may be performed in a different order, and/or may be performed in repetitive manner.

At 30, in a first state when a voltage at a winding terminal (e.g. first terminal 13 in FIG. 2) is positive, a first capacitor (for example C1 of FIGS. 1 and 2) of a snubber circuit is discharged. At 31, in a second state when the voltage at the winding terminal goes to negative values, a second capacitor (for example C3 of FIG. 2) coupled between a supply voltage node (for example 15 in FIG. 2) and a winding terminal (for example 13 in FIG. 2) is charged. This, applied to the embodiments of FIGS. 1 and 2, leads to the operation described above with respect to FIG. 2.

Figure 4:
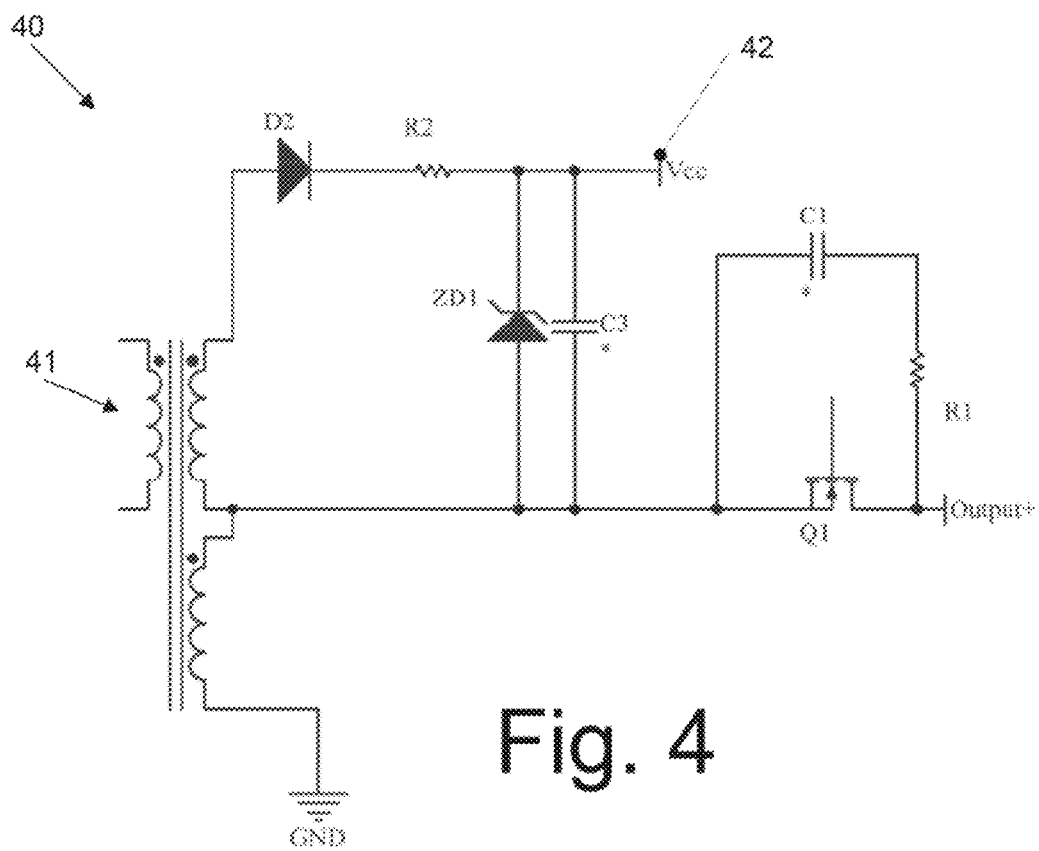
FIG. 4 illustrates a converter circuit according to a comparative example.

FIG. 4 illustrates a converter device 40 according to a reference example, which will be used as a reference for comparison with the embodiment of FIGS. 1 to 2 using illustrative simulation below. The device of FIG. 4 uses a snubber circuit R1, C1 coupled between terminals of a switch Q1. Compared to the embodiment of FIGS. 1-2, current path 16 is omitted, and an additional winding of a transformer 41 is used to generate a supply voltage at a node 42.

Figure 5A:
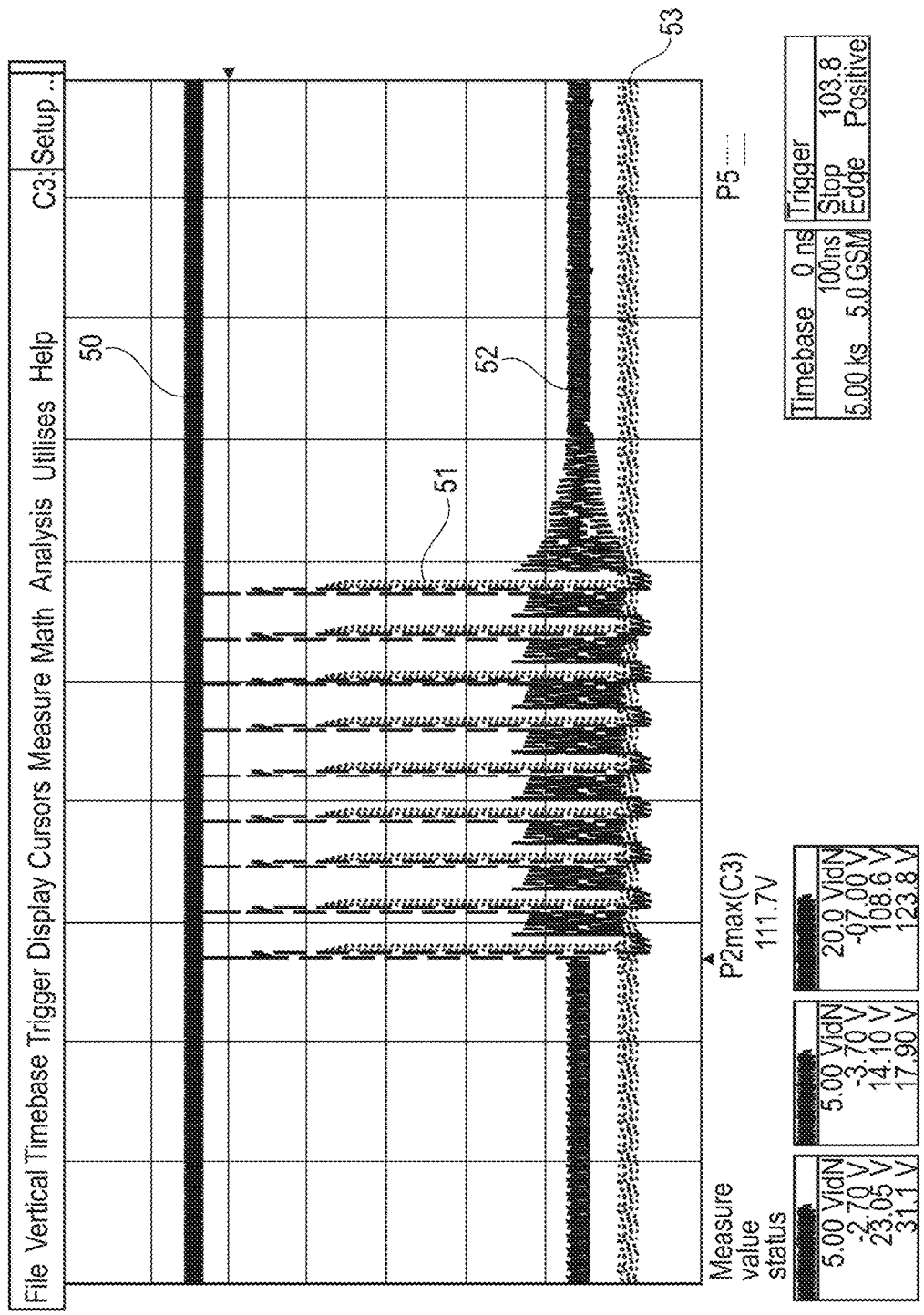
FIGS. 5A to 5D illustrate simulation results comparing operation of a circuit like the one illustrated in FIG. 1 to the comparative example of FIG. 4.
Figure 5B:
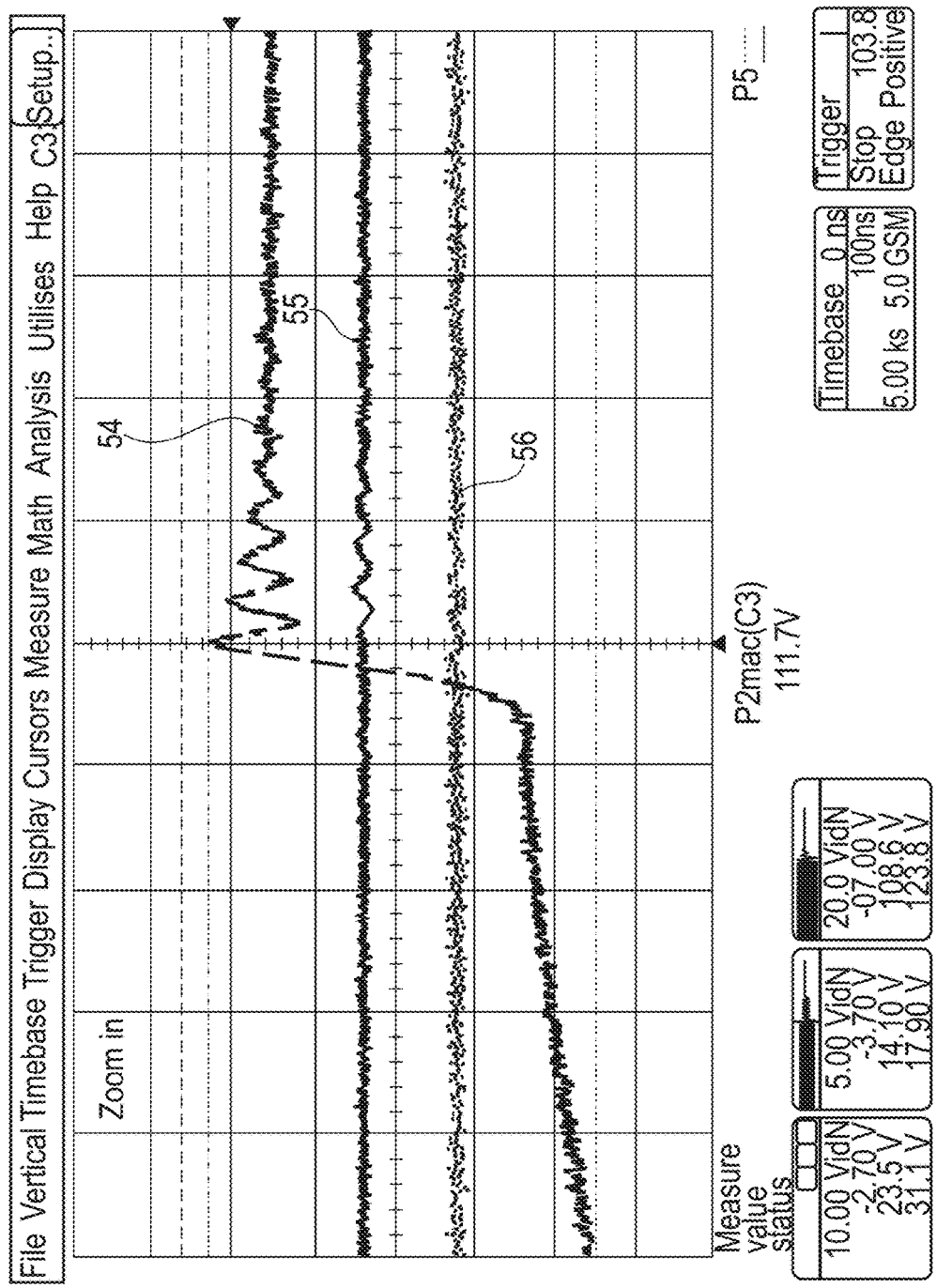
Figure 5C:
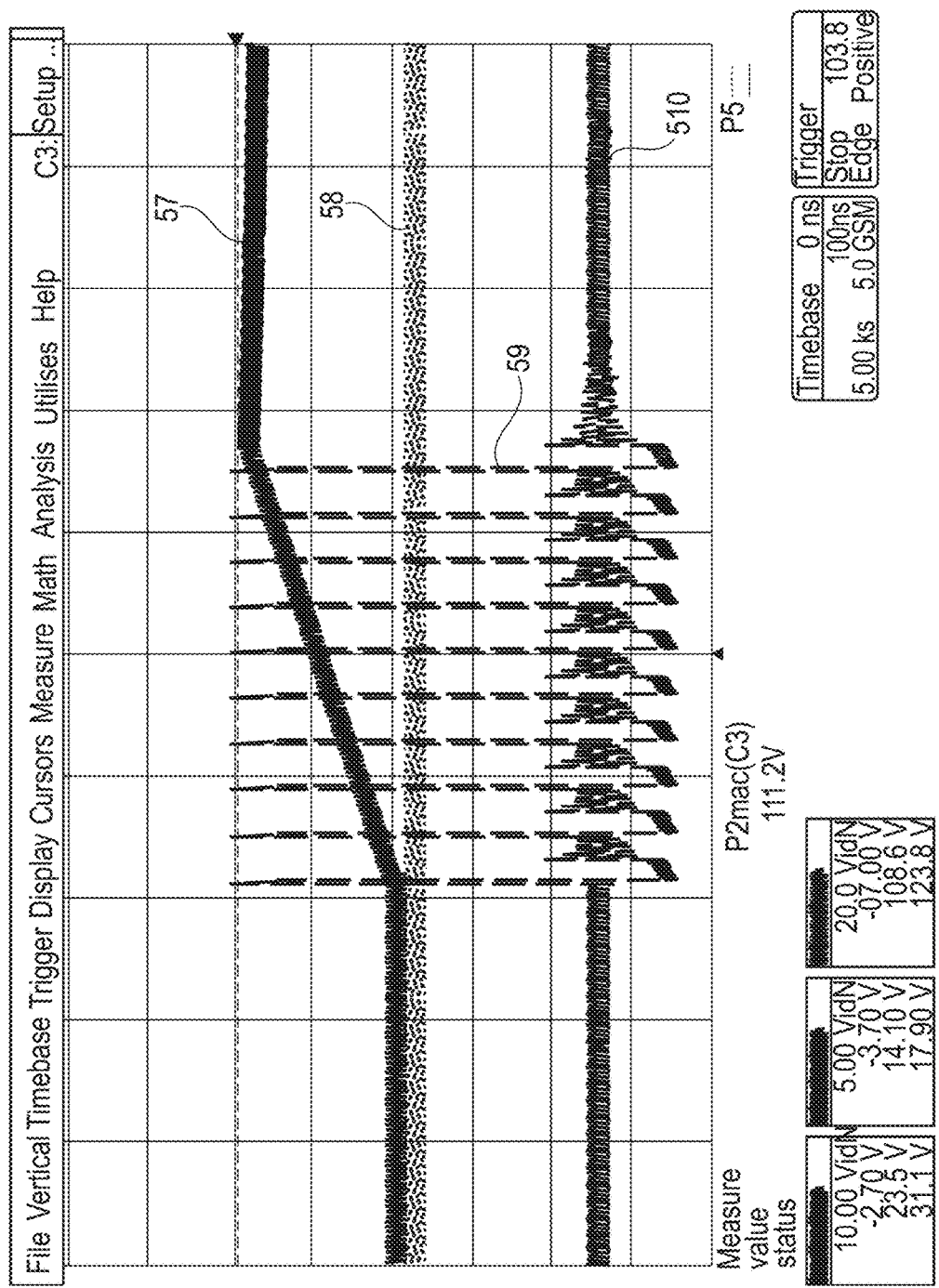
Figure 5D:
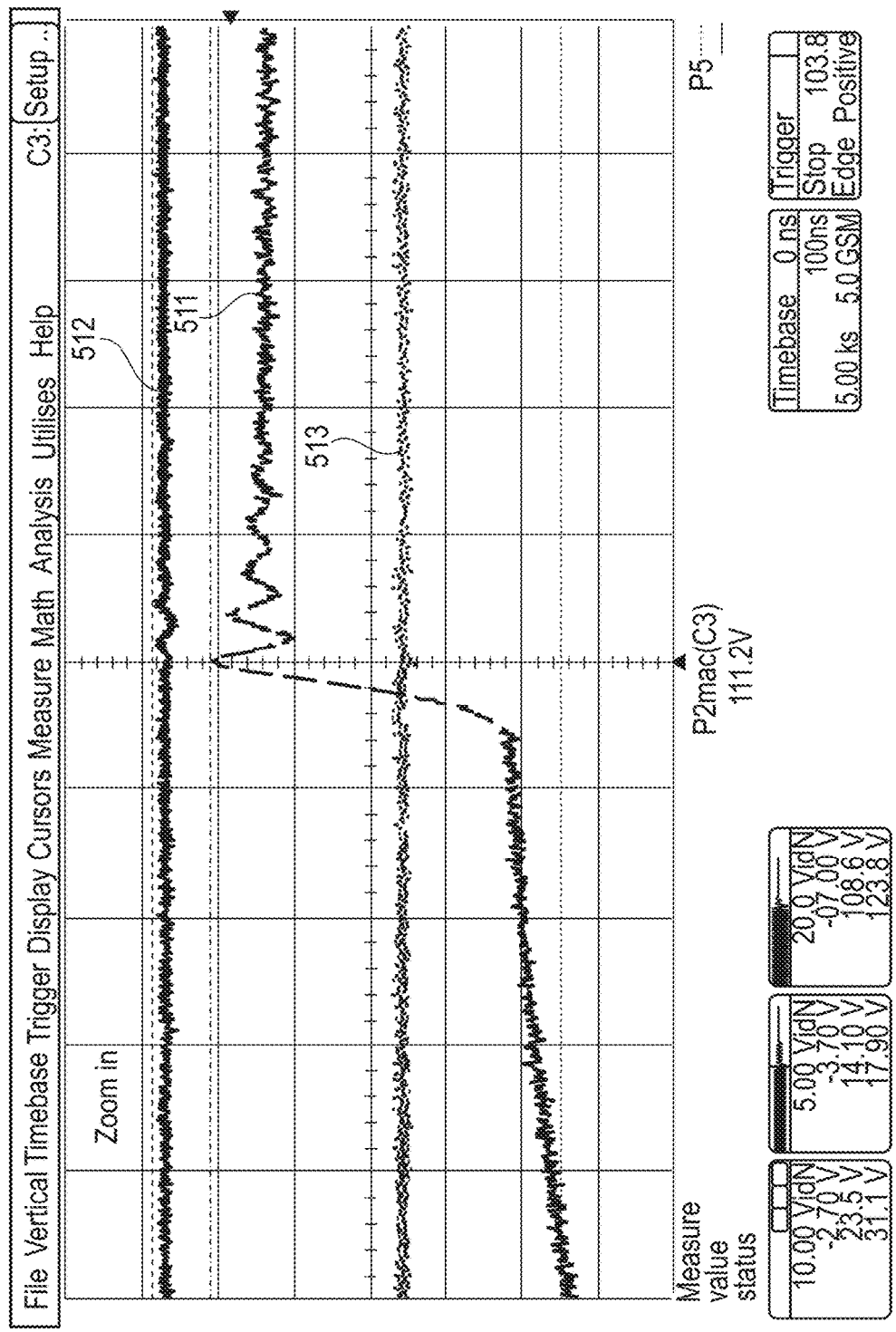

FIGS. 5A to 5D illustrate simulation results for drain source stress checking for the switch Q1 for the embodiment of FIGS. 1 and 2 on the one hand and for the reference example of FIG. 4 on the other hand. In particular, FIGS. 5A and 5B illustrate results for the reference example, and FIGS. 5C and 5D show results for the embodiment of FIGS. 1 and 2. Curves 50 to 53 in FIG. 5A for the reference example correspond to curves 57 to 510 in FIG. 5C for the embodiment of FIGS. 1 and 2, and curves 54 to 56 in FIG. 5B for the reference example corresponds to curves 511 to 513 in FIG. 5D for the embodiment of FIGS. 1 and 2. FIGS. 5B and 5D essentially show magnified sections of the results of FIGS. 5A and 5B respectively. Curve 54 shows a drain source voltage Vds of switch Q1, curves 55, 512 illustrates the supply voltage Vcc generated, and curves 56, 513 illustrate a gate source voltage of the switch. A burst mode shows a worst case of Q1 Vds stress. FIG. 5 shows the use of a snubber circuit to provide supply voltage Vcc such it does not influence the function of the snubber, while the voltage stress of the circuit according to the embodiment is same as for the reference example (Waveforms of curves 511 and 54 give the Vds stress of Q1, waveforms 50 and 57 show that the supply voltage Vcc during burst mode is low with lower power consumption to provide better efficiency.

As can be seen, even if ripples are present in the drain source voltage (curves 54, 511), in embodiments the supply voltage generated (for example curve 512) is stable, such that even without an additional winding, at least a same quality of the generated supply voltage Vcc as in the reference solution is obtained. In other words, a same voltage stress has been observed. Moreover, the average efficiency of the embodiment is slightly increased or at least similar to the conversion efficiency of the reference example, depending on an input voltage used. This applies both to full load and partial load. Therefore, with embodiments a cost saving may be obtained by being able to omit an extra winding, while at the same time providing at least a similar performance compared to the reference example.

The following examples are example embodiments.

Example 1

A voltage converter device, comprising:
a first terminal to be coupled to a winding of a transformer,
a second terminal to provide an output voltage,
a switch coupled between the first terminal (13) and the second terminal (14),
a snubber circuit having a first snubber terminal and a second snubber terminal, wherein the first snubber terminal is coupled between the switch (Q1) and the second terminal,
a first diode (D2) coupled between the second snubber terminal and a supply voltage node (15),
a first capacitor (C3) coupled between the supply voltage node (15) and the first terminal (13), and
an additional current path (16) having a first end and a second end, wherein a first end of the additional current path is coupled between the first terminal (13) and the switch (Q1) and wherein the second end of the additional current path is coupled between the second snubber terminal and the first diode (D2).

Example 2

The voltage converter device of example 1, wherein the snubber circuit (12) comprises a first resistor (R1) coupled in series to a second capacitor (C1).

Example 3

The voltage converter device of example 1 or 2, further comprising a second resistor (R2) coupled between the first diode (D2) and the second end of the additional current path (16).

Example 4

The voltage converter device of any of examples 1-3, further comprising a second diode (ZD1) coupled in parallel to the first capacitor (C3).

Example 5

The voltage converter device of example 4, wherein the second diode (ZD1) is a Zener diode.

Example 6

The voltage converter device of any of examples 1-5, wherein the additional current path comprises a third diode (D1).

Example 7

The voltage converter device of example 6, wherein an anode of the third diode (D1) is coupled to the first end of the additional current path, and a cathode of the diode is coupled to the second end of the additional current path.

Example 8

The voltage converter device of any of examples 1-7, wherein the additional current path comprises a third capacitor (C2).

Example 9

The voltage converter device of example 6 or 7 and example 8, wherein the third capacitor (C2) is coupled in parallel to the third diode (D1).

Example 10

The voltage converter device of any of examples 1-9, further comprising a winding of a transformer coupled to the first terminal.

Example 11

The voltage converter device of any of examples 1-10, wherein the device is integrated in a single chip.

Example 12

A voltage converter device, comprising:
a first terminal (13) to be coupled to a winding,
a second terminal (14) to output a voltage,
a switch transistor coupled between the first terminal (13) and the second terminal (14),
a series connection between a first resistor (R1) and a first capacitor (C1) coupled between a first node and a second node, wherein the first node is between the switch transistor (Q1) and the second terminal (14),
at least one of a diode (D1) and a second capacitor (C2) coupled between a third node and the second node, wherein the third node is between the first terminal (13) and the switch transistor (Q2),
a series connection of a second resistor (R2) and a second diode (D2) coupled between the second node and a supply voltage node (15), and
a parallel connection of a third diode (ZD1) and a third capacitor (C3) coupled between the third node and the supply voltage node (15).

Example 13

The voltage converter device of example 12, wherein the at least one of the first diode and the second capacitor comprise a parallel connection of the first diode and the second capacitor.

Example 14

The voltage converter device of example 13, further comprising a control circuit (11) coupled to the supply voltage node (15) and a control terminal of the switch transistor (Q1).

Example 15

A flyback converter, comprising at least one device of any of examples 1-14.

Example 16

A method of operating a voltage converter device, the voltage converter device comprising:
a first terminal to be coupled to a winding of a transformer,
a second terminal to provide an output voltage,
a switch coupled between the first terminal (13) and the second terminal (14),
a snubber circuit having a first snubber terminal and a second snubber terminal, wherein the first snubber terminal is coupled between the switch (Q1) and the second terminal,
a first diode (D2) coupled between the second snubber terminal and a supply voltage node (15),
a first capacitor (C3) coupled between the supply voltage node (15) and the first terminal, and
an additional current path (16) having a first end and a second end, wherein a first end of the additional current path is coupled between the first terminal (13) and the switch (Q1) and wherein the second end of the additional current path is coupled between the second snubber terminal and the first diode (D2),
the method comprising:
discharging a second capacitor of the snubber circuit in a first state of the voltage converter circuit, and
charging the second capacitor in a second state of the voltage converter circuit.

Example 17

The method of example 16, wherein in the first state a voltage at the first terminal (13) is positive, and wherein in the second state the voltage at the first terminal is negative.

Example 18

The method of example 16 or 17, wherein the method operates the device of example 1.

The invention claimed is:
1. A voltage converter device, comprising:
a first terminal to be coupled to a winding of a transformer,
a second terminal to provide an output voltage,
a switch coupled between the first terminal and the second terminal,
a snubber circuit having a first snubber terminal and a second snubber terminal, wherein the first snubber terminal is coupled between the switch and the second terminal,
a first diode coupled between the second snubber terminal and a supply voltage node,
a first capacitor directly connected to the supply voltage node and the first terminal, and
an additional current path having a first end and a second end, wherein the first end of the additional current path is coupled between the first terminal and the switch and wherein the second end of the additional current path is coupled between the second snubber terminal and the first diode.
2. The voltage converter device of claim 1, wherein the snubber circuit comprises a first resistor coupled in series to a second capacitor.

3. The voltage converter device of claim 1, further comprising a second resistor coupled between the first diode and the second snubber terminal of the additional current path.

4. The voltage converter device of claim 1, further comprising a second diode coupled in parallel to the first capacitor.

5. The voltage converter device of claim 4, wherein the second diode is a Zener diode.

6. The voltage converter device of any one of claim 1, wherein the additional current path comprises a third diode.

7. The voltage converter device of claim 6, wherein an anode of the third diode is coupled to the first end of the additional current path, and a cathode of the third diode is coupled to the second end of the additional current path.

8. The voltage converter device of any of claim 1, wherein the additional current path comprises a third capacitor.

9. The voltage converter device of claim 8, wherein the additional current path comprises a third diode and wherein the third capacitor is coupled in parallel to the third diode.

10. The voltage converter device of claim 9,
wherein the snubber circuit comprises a first resistor coupled in series to a second capacitor, and
wherein the first resistor and the second capacitor are coupled between the first snubber terminal and the second snubber terminal.

11. The voltage converter device of claim 9, further comprising a Zener diode coupled in parallel to the first capacitor,
wherein an anode of the second diode is coupled to the first terminal, and
wherein a cathode of the second diode is coupled to the supply voltage node.

12. The voltage converter device of claim 9,
wherein an anode of the third diode is coupled to the first end of the additional current path, and
wherein a cathode of the third diode is coupled to the second end of the additional current path.

13. The voltage converter device of claim 1, further comprising a winding of a transformer coupled to the first terminal.

14. The voltage converter device of claim 1, wherein the device is integrated in a single chip.

15. A voltage converter device, comprising:
a first terminal to be coupled to a winding,
a second terminal to output a voltage,
a switch transistor coupled between the first terminal and the second terminal,
a series connection between a first resistor and a first capacitor coupled between a first node and a second node, wherein the first node is between the switch transistor and the second terminal,
at least one of a diode and a second capacitor coupled between a third node and the second node, wherein the third node is between the first terminal and the switch transistor,
a series connection of a second resistor and a second diode coupled between the second node and a supply voltage node, and
a parallel connection of a third diode and a third capacitor coupled between the third node and the supply voltage node, wherein the third capacitor is directly connected to the third node and the supply voltage node.

16. The voltage converter device of claim 15, wherein the at least one of the first diode and the second capacitor comprise a parallel connection of the first diode and the second capacitor.

17. The voltage converter device of claim 16, further comprising a control circuit coupled to the supply voltage node and a control terminal of the switch transistor.

18. The voltage converter of claim 15, wherein the voltage converter comprises a flyback converter.

19. A method of operating a voltage converter device, the voltage converter device comprising:
a first terminal to be coupled to a winding of a transformer,
a second terminal to provide an output voltage,
a switch coupled between the first terminal and the second terminal,
a snubber circuit having a first snubber terminal and a second snubber terminal, wherein the first snubber terminal is coupled between the switch and the second terminal,
a first diode coupled between the second snubber terminal and a supply voltage node,
a first capacitor directly connected to the supply voltage node and the first terminal, and
an additional current path having a first end and a second end, wherein a first end of the additional current path is coupled between the first terminal and the switch and wherein the second end of the additional current path is coupled between the second snubber terminal and the first diode,
the method comprising:
discharging a second capacitor of the snubber circuit in a first state of the voltage converter circuit, and
charging the second capacitor in a second state of the voltage converter circuit.

20. The method of claim 19, wherein in the first state a voltage at the first terminal is positive, and wherein in the second state the voltage at the first terminal is negative.

* * * * *